US 12,407,681 B2

United States Patent
Young et al.

(10) Patent No.: US 12,407,681 B2
(45) Date of Patent: Sep. 2, 2025

(54) IoT BASED AUTHENTICATION

(71) Applicant: Bank of America Corporation, Charlotte, NC (US)

(72) Inventors: Michael Young, Davidson, NC (US); Graham Wyllie, Charlotte, NC (US); Kelly Keiter, Waxhaw, NC (US); Robert Nyeland Huggins, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 331 days.

(21) Appl. No.: 18/059,727

(22) Filed: Nov. 29, 2022

(65) Prior Publication Data

US 2024/0064140 A1 Feb. 22, 2024

Related U.S. Application Data

(63) Continuation-in-part of application No. 17/892,731, filed on Aug. 22, 2022, now abandoned.

(51) Int. Cl.
*H04L 9/40* (2022.01)
*G16Y 30/10* (2020.01)
(52) U.S. Cl.
CPC .......... *H04L 63/0853* (2013.01); *G16Y 30/10* (2020.01); *H04L 63/107* (2013.01)
(58) Field of Classification Search
CPC .... H04L 63/0853; H04L 63/107; G16Y 30/10
See application file for complete search history.

(56) References Cited

U.S. PATENT DOCUMENTS

| | | | |
|---|---|---|---|
| 9,949,130 B2 | 4/2018 | Ophir et al. | |
| 10,644,891 B2 | 5/2020 | Kravitz et al. | |
| 10,764,374 B1 | 9/2020 | Marquardt et al. | |
| 2009/0189736 A1* | 7/2009 | Hayashi | G06F 21/32 340/5.81 |
| 2016/0055487 A1* | 2/2016 | Votaw | G06Q 20/384 705/44 |

(Continued)

FOREIGN PATENT DOCUMENTS

| | | |
|---|---|---|
| CN | 113971555 A | 1/2022 |
| WO | 2018147988 A1 | 8/2018 |

OTHER PUBLICATIONS

"Dahir et al., Dynamic Trust and Risk Scoring Using Last-Known Profile Learning, Aug. 31, 2016, IP.com Prior Art Database, entire document" (Year: 2016).

*Primary Examiner* — David J Pearson
*Assistant Examiner* — Nega Woldemariam
(74) *Attorney, Agent, or Firm* — Banner & Witcoff, Ltd.

(57) ABSTRACT

Aspects of the disclosure relate an IoT authentication system to strengthen and streamline authentication for transaction processing for users. A transaction computing platform using artificial intelligence may receive from a plurality of IoT devices information regarding interactions with a user. In some arrangements, transaction computing platform may generate constellations based on the received information. A trust status may be determined based on the generated constellations. Transaction authentication may be based at least in part on the determined trust status. In some embodiments, real-time updates of trust status along with transaction alerts may be provided to IoT devices.

17 Claims, 5 Drawing Sheets

(56) References Cited

U.S. PATENT DOCUMENTS

| | | | |
|---|---|---|---|
| 2018/0336332 A1* | 11/2018 | Singh | H04L 9/3271 |
| 2020/0134061 A1 | 4/2020 | Gaber et al. | |
| 2020/0244750 A1* | 7/2020 | Park | H04L 12/2825 |
| 2020/0311734 A1 | 10/2020 | Mardikar et al. | |
| 2021/0398684 A1* | 12/2021 | Mesirow | G16H 50/70 |
| 2022/0070163 A1* | 3/2022 | Yarabolu | H04L 63/105 |
| 2022/0172211 A1* | 6/2022 | Muthuswamy | G06F 16/288 |
| 2023/0084120 A1* | 3/2023 | Prosad | G06N 3/0455 |
| | | | 709/206 |
| 2023/0237335 A1* | 7/2023 | Hallac | G07C 5/08 |
| | | | 706/12 |
| 2023/0308453 A1* | 9/2023 | Lefèvre | H04L 63/105 |
| 2023/0401578 A1 | 12/2023 | Nair et al. | |
| 2024/0038032 A1* | 2/2024 | Zalewski | G07G 1/0072 |
| 2024/0062202 A1* | 2/2024 | Young | G06Q 20/308 |
| 2024/0062218 A1* | 2/2024 | Young | G06Q 20/401 |
| 2024/0064140 A1* | 2/2024 | Young | G16Y 30/10 |
| 2024/0073219 A1* | 2/2024 | Maizels | H04L 63/0861 |

* cited by examiner

IoT BASED AUTHENTICATION

CROSS-REFERENCE TO RELATED APPLICATION

This application is a continuation-in-part of U.S. patent application Ser. No. 17/892,731 filed on Aug. 22, 2022. The above-identified application is incorporated by reference herein in its entirety.

BACKGROUND

Aspects of the disclosure relate to computing infrastructure, networks, systems, sensors and devices for authenticating user transactions. Such an environment may include IoT (Internet of Things) devices that provide a plethora of sensor data associated with users.

Currently, users make numerous transactions via electronic devices using different service providers' and merchants' platforms. The authentication processes utilized by some service providers and merchants does not provide adequate user authentication protections as they rely solely on user names and passwords for authentication. The use of usernames and passwords is no longer enough as usernames and passwords are easily compromised. In addition, the use of just user names and passwords for authentication does not ensure that the entity providing the user name and password is an authorized user.

Furthermore, it can be problematic at times and time consuming for users to access each service providers or merchants platforms to initiate various transaction requests through the different platforms. For each platform, users must remember a username and password combination which are frequently forgotten and easily comprised. There is a need to develop a system to strengthen and streamline authentication for transaction processing for users. The system should also reduce a user's time commitment and improve the user's digital transaction experience.

SUMMARY

In light of the foregoing background, the following presents a simplified summary of the present disclosure in order to provide a basic understanding of various aspects of the disclosure. The summary is not limiting with respect to the exemplary aspects of the disclosure described herein and is not an extensive overview of the disclosure. It is not intended to identify key or critical elements of or steps in the disclosure or to delineate the scope of the disclosure. Instead, as would be understood by a person of ordinary skill in the art, the following summary merely presents some concepts of the disclosure in simplified form as a prelude to the more detailed description provided below. Moreover, sufficient written descriptions of the embodiments of this application are disclosed in the specification throughout this application along with exemplary, non-exhaustive, and non-limiting manners and processes of making and using the inventions, in such full, clear, and concise, and exact terms in order to enable skilled artisans to make and use the inventions without undue experimentation and sets forth the best mode contemplated by the inventor for carrying out the inventions.

Aspects of this disclosure address one or more shortcomings in the industry by providing an IoT authentication system to strengthen and streamline authentication for transaction processing for users. A transaction computing platform may receive from a plurality of IoT devices information regarding interactions with a user. In some arrangements, transaction computing platform may generate constellations based on the received information. A trust status may be determined based on the generated constellations. Transaction authentication may be based at least in part on the determined trust status. In some embodiments, real-time updates of trust status along with transaction alerts may be provided to IoT devices.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized and structural and functional modifications may be made, without departing from the scope of the present disclosure.

It is noted that various connections between elements are discussed in the following description. It is also noted that these connections are general and, unless specified otherwise, may be direct or indirect, wired or wireless, and that the specification is not intended to be limiting.

Figure 1:
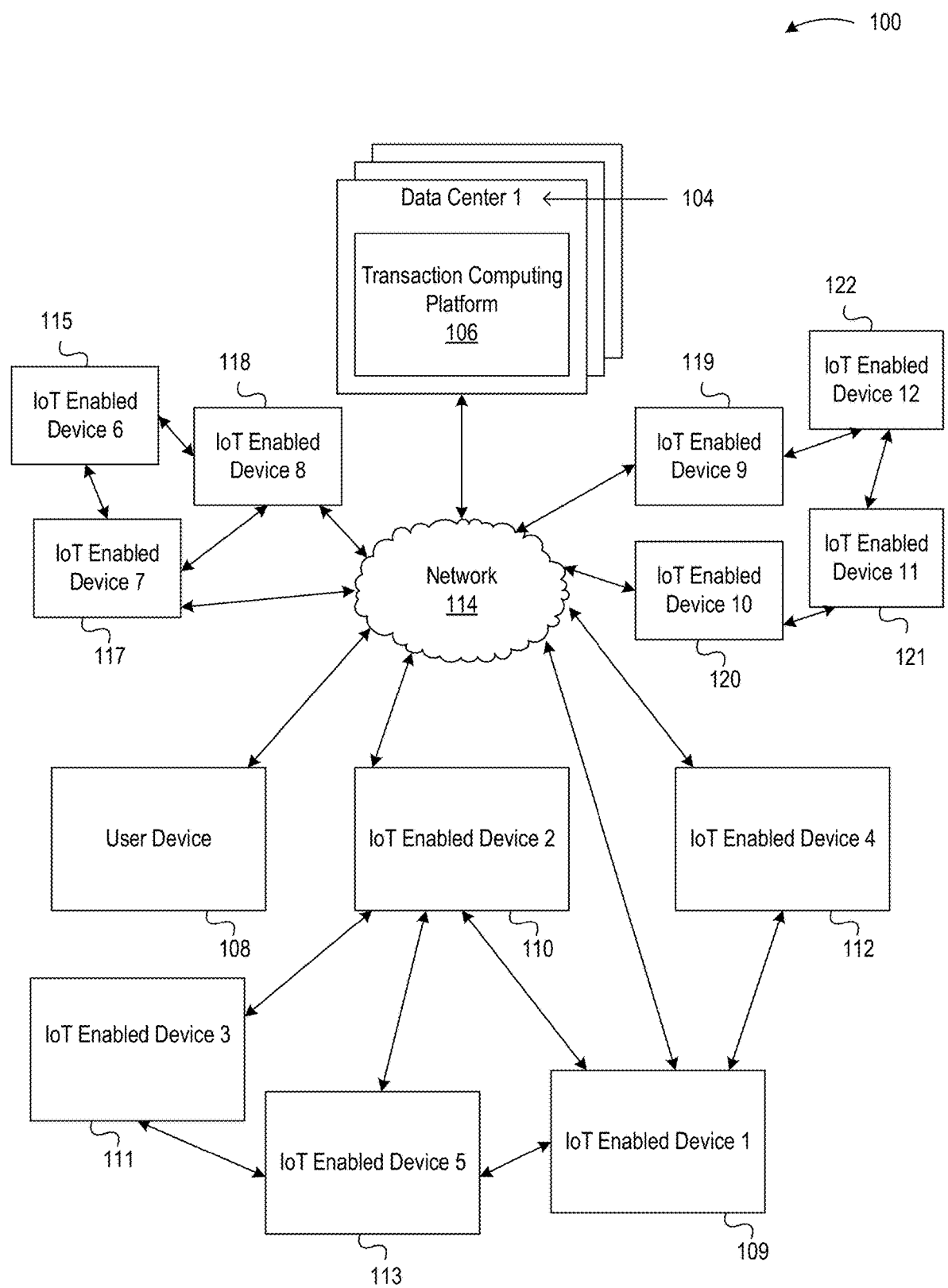
FIG. 1 depicts an illustrative environment in which IoT transactions are provided in accordance with one or more illustrative aspects described herein.

FIG. 1 depicts an illustrative computing environment 100 for using IoT enabled devices with various embodiments of the disclosure. Computing environment 100 may include one or more data centers and one or more computing devices, including computing devices located at or within such data centers and computing devices not located at or within such data centers. For example, computing environment 100 may include a first data center 104. Data center 104 may include a transaction computing platform 106. Computing environment 100 also may include a user device 108, a first IoT enabled device 109, a second IoT enabled device 110, a third IoT enabled device 111, a fourth IoT enabled device 112, and a fifth IoT device 113. Those skilled in the art will realize that numerous user devices and IoT enabled devices may be utilized in the described computing environment.

Data center 104 may be a distinct and physically separate data center operated by and/or otherwise associated with an organization, such as a financial institution. In addition, data center 104 may house a plurality of server computers and various other computers, network components, and devices.

In an aspect of the disclosure, transaction computing platform 106 may be configured to provide one or more portal interfaces to one or more client devices and/or may be configured to authorize and/or accept one or more transactions such as payment transaction associated with acceptance devices such as IoT enabled device 110 and 112. In another aspect of the disclosure, transaction computing platform 106 may be configured to authenticate user devices or IoT enabled devices as needed.

In some arrangements, data center 104 may include one or more client account servers, which may be configured to store and/or maintain information associated with one or more client accounts. For example, the client account server(s) may be configured to store and/or maintain information associated with one or more financial accounts associated with one or more customers of a financial institution, such as account balance information, transaction history information, and/or the like. In an embodiment, client account server(s) may store information regarding customers' transactions. The information may be accessible by the customer through an IoT enabled device or user device.

Additionally or alternatively, client account server(s) may include and/or integrate with one or more client support servers and/or devices, such as one or more customer service representative devices used by one or more customer service representatives of an organization (which may, e.g., be a financial institution operating data center), to connect one or more customers of the organization with one or more customer service representatives of the organization via one or more telephone support sessions, chat support sessions, and/or other client support sessions.

In one or more arrangements, a user device 108 may be any type of computing device capable of receiving a user interface, receiving input via the user interface, and communicating the received input to one or more other computing devices. For example, a user device may, in some instances, be and/or include server computers, desktop computers, laptop computers, tablet computers, smart phones, or the like that may include one or more processors, memories, communication interfaces, storage devices, and/or other components. As noted above, and as illustrated in detail below, a user device may, in some instances, be one or more special-purpose computing devices configured to perform specific functions. In an embodiment, user device 108 may receive alerts or communications from transaction computing platform 106 regarding current or past transactions. In an embodiment, user device 108 may also be an IoT enabled device.

In an embodiment, user device 108 may communicate with transaction computing platform 106 via network 114 to provide a user with information related to current or previous transactions. In some instances, in addition to being configured to provide uses with transactional information, transaction computing platform 106 also may be configured to provide a mobile banking portal associated with the financial institution to various customers of the financial institution and/or their associated mobile computing devices. Such portals may, for instance, provide customers of the financial institution with access to financial account information (e.g., account balance information, purchase transactions, account statements, recent transaction history information, or the like) and/or may provide customers of the financial institution with menus, controls, and/or other options to schedule and/or execute various transactions (e.g., online bill pay transactions, person-to-person funds transfer transactions, or the like).

In an aspect of the disclosure, various IoT enabled devices may be associated with particular users or owners of the IoT devices. For instance, IoT enabled device 109 may comprise a refrigerator, IoT enabled device 110 may comprise a smart thermostat, IoT enabled device 111 may comprise a washing machine, IoT device 112 may comprise an outdoor floodlight security camera, and IoT device 113 may comprise a streaming music player. The use of any of these IoT devices or combinations of IoT devices may be used in part to determine the identity of a user of a current or future transaction. For instance, a credit card authorization request made at a remote location may be questioned if IoT device interactions indicate that the user is currently and/or has recently utilized IoT devices at a second location that is different from the remote location of the credit card authorization request. The discrepancy in user location may indicate that the transaction has not been initiated by the user. In an embodiment, a determined inconsistency or discrepancy in user location at the time of credit card transaction may prompt a communication to the user to confirm authentication of the transaction or in some instances denial of the credit card transaction.

In an aspect of the disclosure, numerous unique digital constellations may be generated and associated with users. The unique digital constellations may comprise interactions with different IoT devices during different time periods and/or at same geographical location. For instance, a user may weekdays between 7:00 pm and 9:00 pm interact with particular IoT devices in their home. In an embodiment, a user may during this time period normally utilize streaming music player IoT device 113, smart led light IoT device 112, and smart IoT user device 108. In an embodiment, the utilization of these three IoT devices during that particular time period may be determined to be constellation pattern number 1 associated with the user. Transaction computing platform 106 may determine numerous constellations associated with a user.

FIG. 1 further illustrates additional IoT devices that may be associated with a second or different system user. For instance, IoT enabled device 115 may comprise a smart TV, IoT enabled device 117 may comprise a smart phone, and IoT enabled device 118 may comprise a security camera. Each of IoT enabled devices 115, 117, 118 may be associated with a second user. In an embodiment, the second user may be a next door neighbor to the first user. In an embodiment, if associated permissions from both users are obtained each user may utilize to the extent allowed the other user's IoT devices for transaction authentication purposes.

In an embodiment, transaction computing platform 106 may determine additional constellations associated with each user based on different combinations of both users IoT enabled devices. For instance, the second user may on weekdays between 7:00 pm and 9:00 pm interact with particular IoT devices in their home. In an embodiment, the second user may during this time period normally utilize smart phone IoT enabled device 117 and smart TV IoT enabled device 115. The second user may also interact just before that time period with the first user's IoT enabled device 112 (outdoor floodlight security camera) upon arrival home from work. The utilization of these two IoT enabled devices during that particular time period along with the activation of the first user's IoT device 112 just prior to that time period may be determined to be constellation pattern 1001 which may be associated with both first and second users.

In an embodiment, a transaction request on the first user's credit card at a store 800 miles away during a weekday between 7:00 pm and 9:00 pm may be compared to constellation pattern 1001 to assist in authenticating the credit card transaction. The transaction may be denied based on the comparison. In an embodiment, the first user may be notified of the attempted credit card transaction.

In an aspect of the disclosure, IoT devices may include sensors capable of detecting many different inputs in relation to pressure, force, electrical stimulus, optical detection, water detection, humidity detection, sound detection, location, presence, and/or other tangible inputs. Some examples of sensors include, but are not limited to ultrasonic sensors, optical sensors, microphones, pressure sensors, and infrared sensors.

In an aspect of the disclosure, numerous IoT devices which may be used in different aspects of the disclosure and may include smart watches, identification cards with smart chips, embedded clothing devices, and smart doorbells. Those skilled in art will realize that many additional IoT enabled devices such as numerous appliances and smart electronic devices may be utilized in various aspects of the disclosure.

In another aspect of the disclosure, a user may be in contact with or interact with the same IoT enabled devices at some regular interval during the day or week. For instance, a user may take the same route to and from work at approximately the same time each workday. Along the route, a user may interact with the same IoT enabled devices. These devices may include the user's automobile 119, a coffee shops beacon advertising messaging system 120, a parking garage scanner 121, and an identification badge scanner 122. In an embodiment, transaction computing platform 106 may generate a constellation based on the interactions with the IoT enabled devices. The generated constellation may be stored and used in authenticating future transactions. The generated constellation by transaction computing platform 106 may include time stamps and/or geolocation information. The geolocation may be based on GPS and/or triangulation between IoT devices and their associated constellations that are part of the authentication service.

Figure 2:
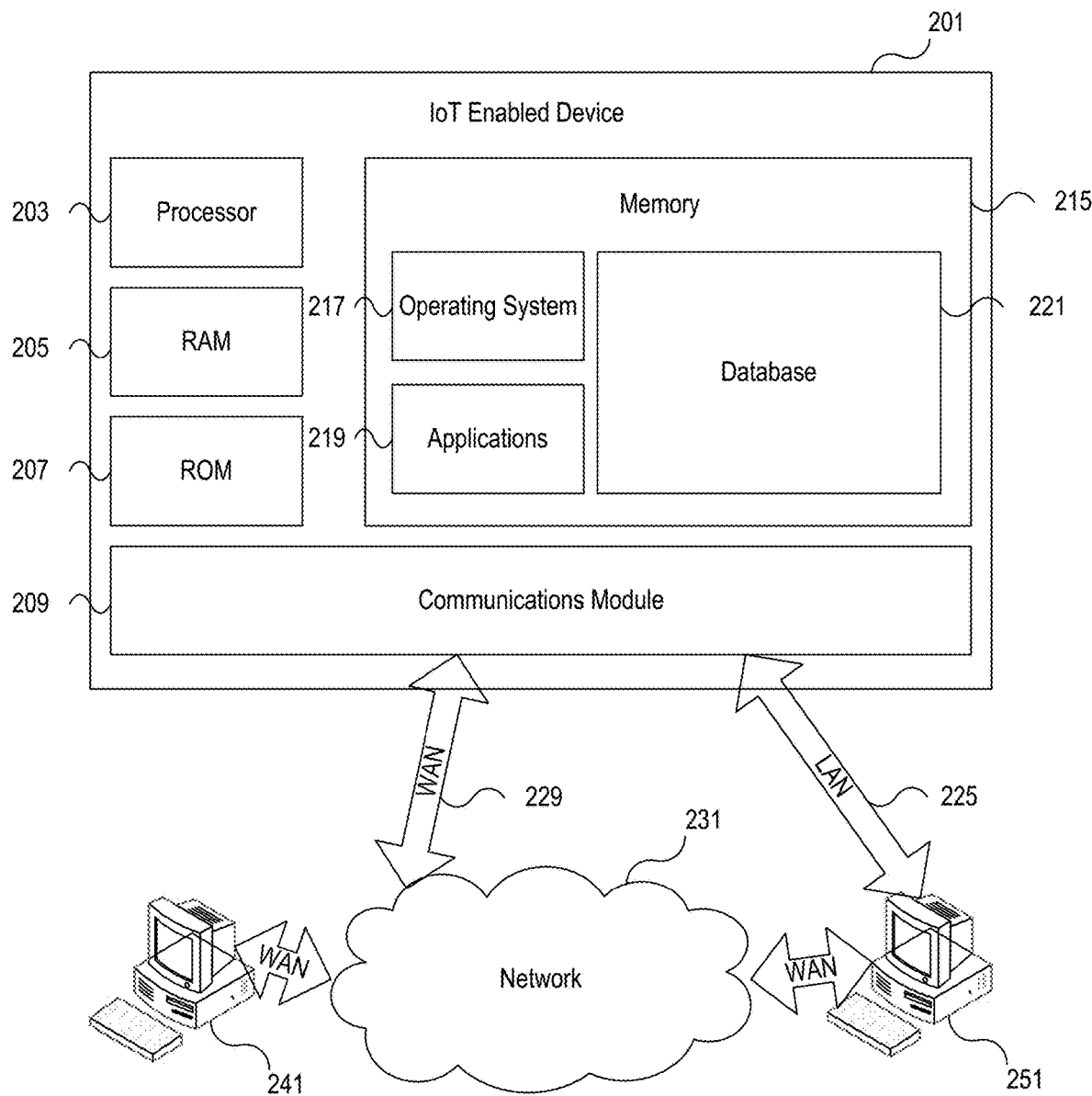
FIG. 2 shows hardware elements of an IoT enabled device in accordance with one or more illustrative aspects described herein.

FIG. 2 shows hardware elements of an IoT enabled device 201 that may be used to implement various embodiments of the disclosure. IoT enabled device 201 may include a processor 203 for controlling overall operation of IoT enabled device 201 and its associated components, including Random Access Memory (RAM) 205, Read-Only Memory (ROM) 207, communications module 209, and memory 215. IoT enabled device 201 may include a variety of computer readable media. Computer readable media may be any available media that may be accessed by IoT enabled device 201, may be non-transitory, and may include volatile and non-volatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by IoT enabled device 201.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor associated with an IoT enabled device 201. Such a processor may execute computer-executable instructions stored on a computer-readable medium.

Software may be stored within memory 215 and/or storage to provide instructions to processor 203 for enabling IoT enabled device 201 to perform various functions as discussed herein. For example, memory 215 may store software used by IoT enabled device 201, such as operating system 217, application programs 219, and associated database 221. In addition, some or all of the computer executable instructions for IoT enabled device 201 may be embodied in hardware or firmware. Although not shown, RAM 205 may include one or more applications representing the application data stored in RAM 205 while IoT enabled device 201 is on and corresponding software applications (e.g., software tasks) are running on IoT enabled device 201.

Communications module 209 may include a microphone, keypad, touch screen, and/or stylus through which a user IoT enabled device 201 may provide input, and may include one or more speakers for providing audio output and a video display device for providing textual, audiovisual and/or graphical output.

IoT enabled device 201 may operate in a networked environment supporting connections to one or more remote computing devices, such as computing devices 241 and 251. Computing devices 241 and 251 may be personal computing devices or servers that include any or all of the elements described above relative to IoT enabled device 201.

The network connections depicted in FIG. 2 may include Local Area Network (LAN) 225 and Wide Area Network (WAN) 229, as well as other networks. When used in a LAN networking environment, IoT enabled device 201 may be connected to LAN 225 through a network interface or adapter in communications module 209. When used in a WAN networking environment, IoT enabled device 201 may include a modem in communications module 209 or other means for establishing communications over WAN 229, such as network 231 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The network 231 may comprise the communication links, an in-home network, a network provider's wireless, coaxial, fiber, or hybrid fiber/coaxial distribution system (e.g., a DOCSIS network), or any other desired network. The IoT enabled device and/or user device may comprise location-detecting devices, such as global positioning system (GPS) microprocessors, which may be configured to receive and process global positioning signals and determine, with possible assistance from an external server and antenna, a geographic position of the IoT enabled device and/or user device.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

Although FIG. 2 shows an example hardware configuration, one or more of the elements of the IoT enabled device 201 and/or user device may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing IoT enabled device 201 may store computer-executable instructions that, when executed by the processor 203, cause the IoT enabled device 201 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Figure 3:
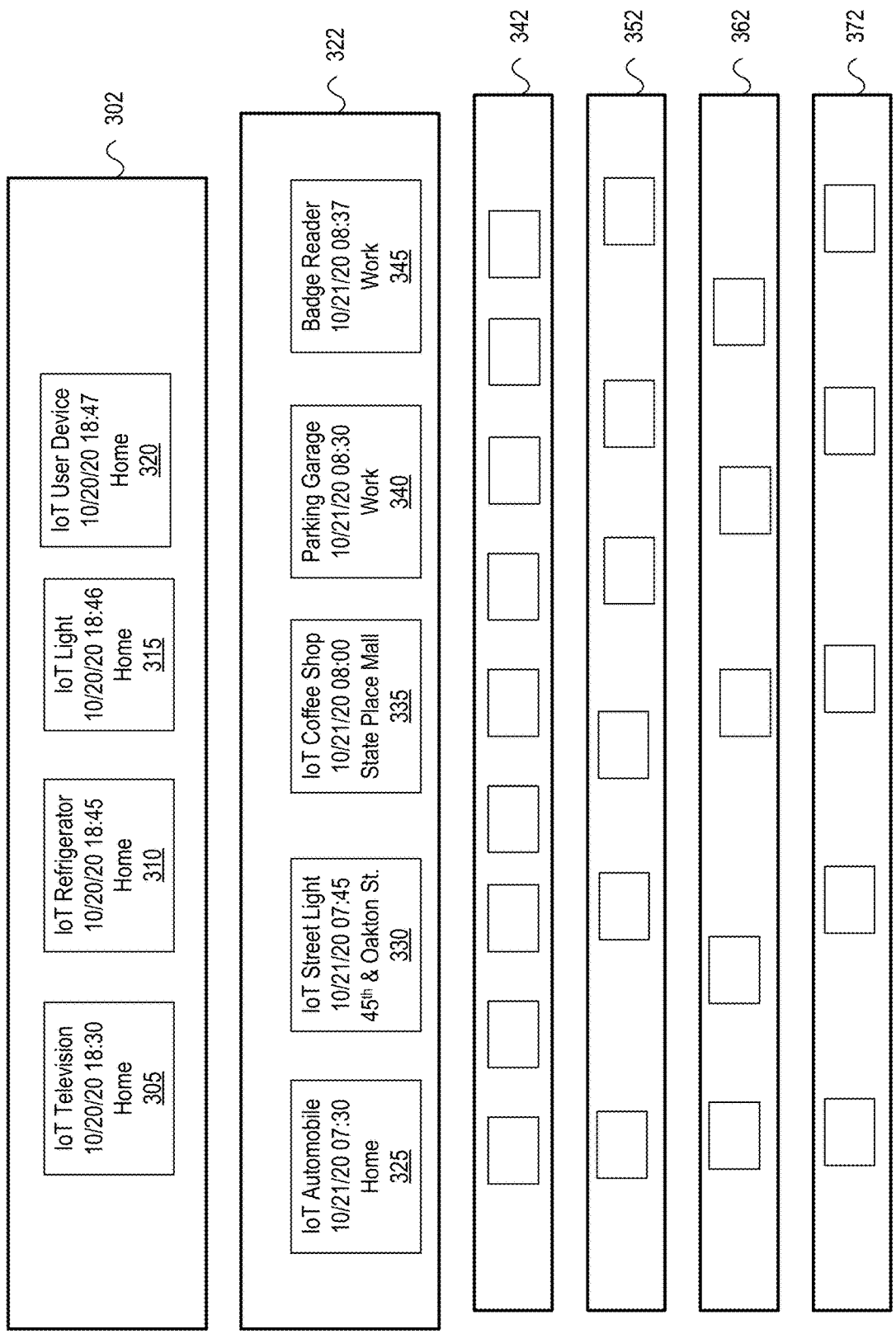
FIG. 3 depicts an illustrative diagram of generated constellations in accordance with one or more example embodiments.

FIG. 3 depicts an illustrative diagram of various generated constellations that may be used to implement the processes and functions of certain aspects of the present disclosure in accordance with one or more example embodiments. As illustrated in FIG. 3, numerous constellations 302, 322, 342, 352, 362 and 372 may be generated based on a user's interactions with numerous IoT devices. In an embodiment, each constellation may represent a unique digital pattern of IoT device interactions with a user. Each generated constellation may include geographical information along with time stamped information regarding the IoT device interactions. For instance, constellation 302 represents a user's interaction with an IoT television, an IoT refrigerator, an IoT light, and an IoT user device. Each interaction between an IoT device and the user may be time stamped and include the geographical location of the interaction. In an embodiment, transaction computing platform 106 may store each determined constellation for use in authenticating user transactions.

In an aspect of the disclosure, transaction computing platform 106 may in some embodiments use artificial intelligence or machine learning to determine constellation patterns. In other embodiments, artificial intelligence or machine learning may be used to determine if a user's currently generated constellation is consistent with a user's determined constellations. Such a determination may assist in determining if a user authorized a transaction.

In some instances, a Long Short-Term Memory (LSTM) neural network may be used to correlate generated constellations with detected transactions. In other instances, deep scanning may be used to analyze location history, constellations, time stamps, and frequency of transactions. The use of machine learning and the analysis of constellations may determine instances of fraud occurring during a transaction. The use of machine learning and the analysis of transaction history for users may determine behavior pattern changes and along with determined constellations identify suspicious behavior or fraudulent transactions.

In an aspect of the disclosure, artificial intelligence may also be used by transaction computing platform 106 to capture generated constellations and scan those constellations for additional patterns. The detected patterns may be used to educate an artificial intelligence framework. The artificial intelligence framework may be used in a continuous learning process. For instance, the artificial intelligence framework may continue to scan the entire environment periodically to gather and collate data to make informed decisions regarding new constellation patterns based on transactions. Interactions with third party IoT devices can be integrated to prepare the system to enhance deep learning and to anticipate digital identity. The artificial intelligence neural network method as described herein may help improve digital pattern detection and may have the ability to process and scan entire new data sets to provide effective transaction authentication.

An artificial intelligence algorithm for the intelligent framework may comprise an agent that interacts with transaction computing platform 106 and tries to learn and optimize its knowledge base in real-time. Neural networks refer to systems of neurons, either organic or artificial in nature. A neural network is made up of many perceptron layers. These neurons may receive information in the set of inputs.

These inputs may be combined with a bias and a group of weights, which may then produce a single output that would help us take informed decision regarding constellation generation and detection.

Figure 5:
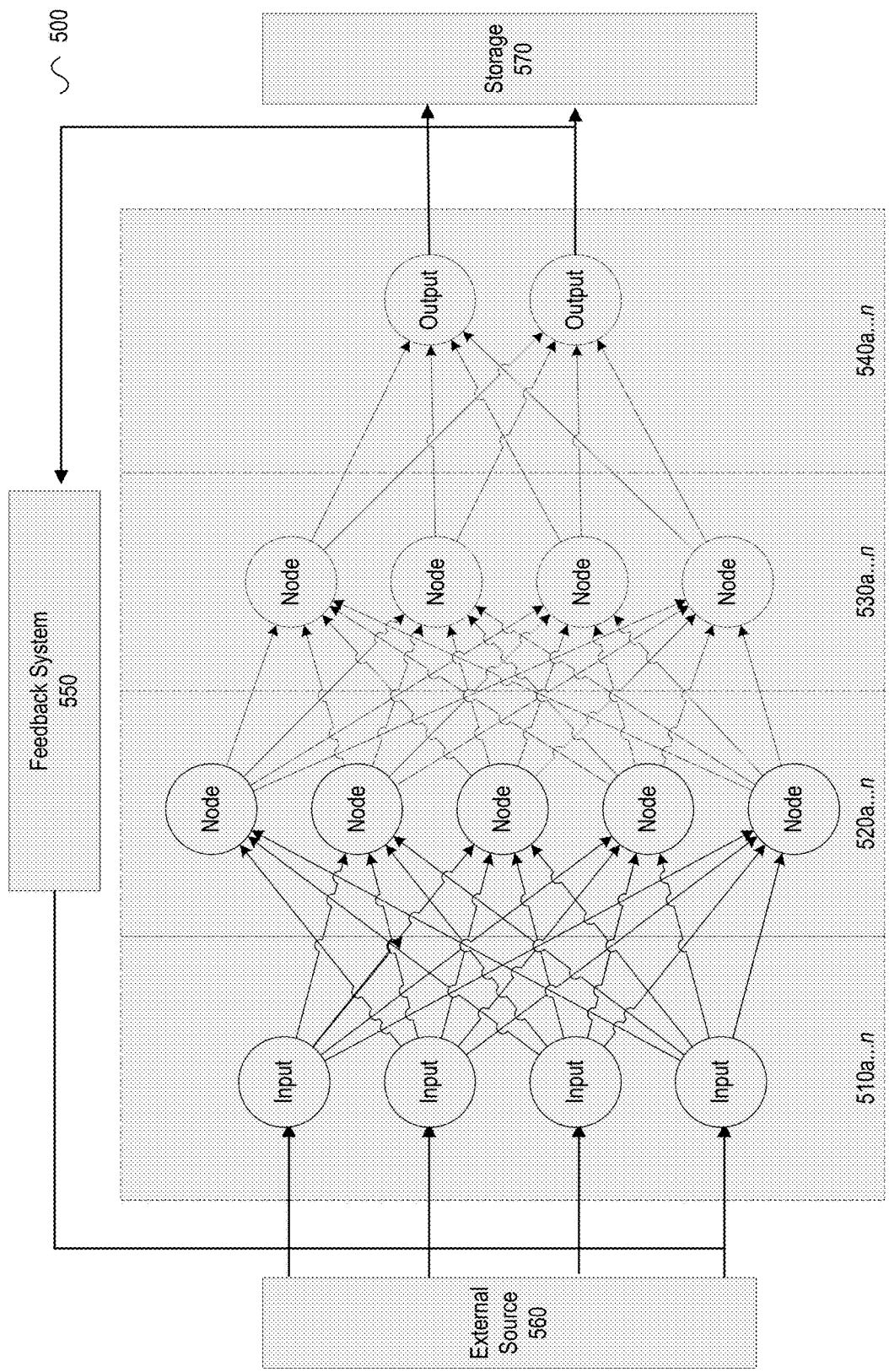
FIG. 5 illustrates a simplified example of an artificial neural network in accordance with an aspect of the disclosure.

FIG. 5 illustrates a simplified example of an artificial neural network 500 on which a machine learning algorithm may be executed. The machine learning algorithm may be used at a ML engine to perform one or more functions of the transaction computing platform 106, as described herein. FIG. 5 is merely an example of nonlinear processing using an artificial neural network; other forms of nonlinear processing may be used to implement a machine learning algorithm in accordance with features described herein.

In one example, a framework for a machine learning algorithm may involve a combination of one or more components, sometimes three components: (1) representation, (2) evaluation, and (3) optimization components. Representation components refer to computing units that perform steps to represent knowledge in different ways, including but not limited to as one or more decision trees, sets of rules, instances, graphical models, neural networks, support vector machines, model ensembles, and/or others. Evaluation components refer to computing units that perform steps to represent the way hypotheses (e.g., candidate programs) are evaluated, including but not limited to as accuracy, prediction and recall, squared error, likelihood, posterior probability, cost, margin, entropy k-L divergence, and/or others. Optimization components refer to computing units that perform steps that generate candidate programs in different ways, including but not limited to combinatorial optimization, convex optimization, constrained optimization, and/or others. In some embodiments, other components and/or sub-components of the aforementioned components may be present in the system to further enhance and supplement the aforementioned machine learning functionality.

Machine learning algorithms sometimes rely on unique computing system structures. Machine learning algorithms may leverage neural networks, which are systems that approximate biological neural networks. Such structures, while significantly more complex than conventional computer systems, are beneficial in implementing machine learning. For example, an artificial neural network may be comprised of a large set of nodes which, like neurons, may be dynamically configured to effectuate learning and decision-making.

Machine learning tasks are sometimes broadly categorized as either unsupervised learning or supervised learning. In unsupervised learning, a machine learning algorithm is left to generate any output (e.g., to label as desired) without feedback. The machine learning algorithm may teach itself (e.g., observe past output), but otherwise operates without (or mostly without) feedback from, for example, a human administrator.

Meanwhile, in supervised learning, a machine learning algorithm is provided feedback on its output. Feedback may be provided in a variety of ways, including via active learning, semi-supervised learning, and/or reinforcement learning. In active learning, a machine learning algorithm is allowed to query answers from an administrator.

One theory underlying supervised learning is inductive learning. In inductive learning, a data representation is provided as input samples data (x) and output samples of the function (f(x)). The goal of inductive learning is to learn a good approximation for the function for new data (x), i.e., to estimate the output for new input samples in the future. Inductive learning may be used on functions of various types: (1) classification functions where the function being learned is discrete; (2) regression functions where the function being learned is continuous; and (3) probability estimations where the output of the function is a probability.

In practice, machine learning systems and their underlying components are tuned by data scientists to perform numerous steps to perfect machine learning systems. The process is sometimes iterative and may entail looping through a series of steps: (1) understanding the domain, prior knowledge, and goals; (2) data integration, selection, cleaning, and pre-processing; (3) learning models; (4) interpreting results; and/or (5) consolidating and deploying discovered knowledge. This may further include conferring with domain experts to refine the goals and make the goals more clear, given the nearly infinite number of variables that can possible be optimized in the machine learning system. Meanwhile, one or more of data integration, selection, cleaning, and/or pre-processing steps can sometimes be the most time consuming because the old adage, "garbage in, garbage out," also reigns true in machine learning systems.

By way of example, in FIG. 5, each of input nodes $510a$-$n$ is connected to a first set of processing nodes $520a$-$n$. Each of the first set of processing nodes $520a$-$n$ is connected to each of a second set of processing nodes $530a$-$n$. Each of the second set of processing nodes $530a$-$n$ is connected to each of output nodes $540a$-$n$. Though only two sets of processing nodes are shown, any number of processing nodes may be implemented. Similarly, though only four input nodes, five processing nodes, and two output nodes per set are shown in FIG. 5, any number of nodes may be implemented per set. Data flows in FIG. 5 are depicted from left to right: data may be input into an input node, may flow through one or more processing nodes, and may be output by an output node. Input into the input nodes $510a$-$n$ may originate from an external source 560.

In one illustrative method using feedback system 550, the system may use machine learning to determine an output. The system may use one of a myriad of machine learning models including xg-boosted decision trees, auto-encoders, perceptron, decision trees, support vector machines, regression, and/or a neural network. The neural network may be any of a myriad of type of neural networks including a feed forward network, radial basis network, recurrent neural network, long/short term memory, gated recurrent unit, auto encoder, variational autoencoder, convolutional network, residual network, Kohonen network, and/or other type. In one example, the output data in the machine learning system may be represented as multi-dimensional arrays, an extension of two-dimensional tables (such as matrices) to data with higher dimensionality.

The neural network may include an input layer, a number of intermediate layers, and an output layer. Each layer may have its own weights. The input layer may be configured to receive as input one or more feature vectors described herein. The intermediate layers may be convolutional layers, pooling layers, dense (fully connected) layers, and/or other types. The input layer may pass inputs to the intermediate layers. In one example, each intermediate layer may process the output from the previous layer and then pass output to the next intermediate layer. The output layer may be configured to output a classification or a real value. In one example, the layers in the neural network may use an activation function such as a sigmoid function, a Tanh function, a ReLu function, and/or other functions. Moreover, the neural network may include a loss function. A loss function may, in some examples, measure a number of missed positives; alternatively, it may also measure a number of false positives. The loss function may be used to determine error when comparing an output value and a target value. For example, when training the neural network the output of the output layer may be used as a prediction and may be compared with a target value of a training instance to determine an error. The error may be used to update weights in each layer of the neural network.

In one example, the neural network may include a technique for updating the weights in one or more of the layers based on the error. The neural network may use gradient descent to update weights. Alternatively, the neural network may use an optimizer to update weights in each layer. For example, the optimizer may use various techniques, or combination of techniques, to update weights in each layer. When appropriate, the neural network may include a mechanism to prevent overfitting—regularization (such as L1 or L2), dropout, and/or other techniques. The neural network may also increase the amount of training data used to prevent overfitting.

Once data for machine learning has been created, an optimization process may be used to transform the machine learning model. The optimization process may include (1) training the data to predict an outcome, (2) defining a loss function that serves as an accurate measure to evaluate the machine learning model's performance, (3) minimizing the loss function, such as through a gradient descent algorithm or other algorithms, and/or (4) optimizing a sampling method, such as using a stochastic gradient descent (SGD) method where instead of feeding an entire dataset to the machine learning algorithm for the computation of each step, a subset of data is sampled sequentially.

In one example, FIG. 5 depicts nodes that may perform various types of processing, such as discrete computations, computer programs, and/or mathematical functions implemented by a computing device. For example, the input nodes 510a-n may comprise logical inputs of different data sources, such as one or more data servers. The processing nodes 520a-n may comprise parallel processes executing on multiple servers in a data center. And, the output nodes 540a-n may be the logical outputs that ultimately are stored in results data stores, such as the same or different data servers as for the input nodes 510a-n. Notably, the nodes need not be distinct. For example, two nodes in any two sets may perform the exact same processing. The same node may be repeated for the same or different sets.

Each of the nodes may be connected to one or more other nodes. The connections may connect the output of a node to the input of another node. A connection may be correlated with a weighting value. For example, one connection may be weighted as more important or significant than another, thereby influencing the degree of further processing as input traverses across the artificial neural network. Such connections may be modified such that the artificial neural network 500 may learn and/or be dynamically reconfigured. Though nodes are depicted as having connections only to successive nodes in FIG. 5, connections may be formed between any nodes. For example, one processing node may be configured to send output to a previous processing node.

Input received in the input nodes 510a-n may be processed through processing nodes, such as the first set of processing nodes 520a-n and the second set of processing nodes 530a-n. The processing may result in output in output nodes 540a-n. As depicted by the connections from the first set of processing nodes 520a-n and the second set of processing nodes 530a-n, processing may comprise multiple steps or sequences. For example, the first set of processing nodes 520a-n may be a rough data filter, whereas the second set of processing nodes 530a-n may be a more detailed data filter.

The artificial neural network 500 may be configured to effectuate decision-making. As a simplified example for the purposes of explanation, the artificial neural network 500 may be configured to detect patterns in constellations and provided effective transaction authentication.

In addition, various other machine learning algorithms may be used without departing from the invention, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. Additional or alternative machine learning algorithms may be used without departing from the invention. In some examples, a machine learning engine may analyze data to identify patterns of activity, sequences of activity, and the like. The artificial neural network 500 may effectuate deep learning.

FIG. 3 further illustrates determined constellations associated with a user that includes interactions with IoT devices from third party entities. For instance, constellation 322 represents a user's interaction with an IoT enabled automobile, an IoT enabled street light 330, an IoT enabled coffee shop 335, an IoT enabled parking garage 340, and an IoT enabled badge reader 345. In an embodiment, transaction computing platform 106 determines constellation 322 based on user interaction from the user's trip to work including interaction with both user's IoT enabled devices and third party owned IoT enabled devices.

In another aspect of the disclosure, an authentication process may authenticate communications between user IoT devices and transaction computing platform 106. In an embodiment, a user may subscribe to the IoT based authentication service and register each IoT enabled device that the user wants to include in the authentication service. In an embodiment, merchants and/or vendors may also register devices and setup accounts to utilize the IoT based authentication service.

After completing the registration and intake process each registered device receives a private key. IoT registered devices and/or transaction computing platform 106 may transact with each other using a trusted key relationship. In an embodiment, transaction computing platform 106 may issue public keys to existing decentralized locations. When IoT registered devices are in communication with other IoT registered devices and/or with transaction computing platform 106, public/private keys may be exchanged during communication for authentication purposes.

In an embodiment, an IoT device or user device may receive notifications from transaction computing platform 106 regarding flagged or denied transactions. The notifications may take numerous forms such an email, text, or phone message.

In an aspect of the disclosure, merchants with numerous IoT enabled devices may also register and participate in the authentication service. In an embodiment, transaction computing platform 106 may upon user permission share trusted/untrusted status of current transaction with merchants. The trusted/untrusted status of a current transaction may be determined by analysis of a generated real-time user constellation. In an embodiment, a merchant may not receive any identifiable information about a user other than the trusted/untrusted status of the current transaction. If current transaction is flagged as untrusted the transaction may be declined at point of sale.

In an aspect of the disclosure, trusted/untrusted status may be based on a consecutive number of IoT interactions and whether those transactions are part of a known or familiar constellation. A risk ranking may be used to indicate level of trust based on the analysis. For instance, if a user's last five IoT enabled devices interactions were with the user's coffee machine, refrigerator, lights, doorbell, and television, and these interactions are within a certain time period, transaction computing platform 106 may determine the user's status is trusted.

In another aspect of the disclosure, a risk scale may be determined by transaction computing platform 106. The risk scale may take into account the number of IoT interactions a user has with third party IoT devices in each of the determined constellations. In an embodiment, if a number of interactions are outside a known or familiar constellation, a risk scale may indicate a higher risk for current or future transactions. A large amount of new third party interactions included in a constellation may indicate a lower trust level for authentication. A new or different determined constellation as compared to stored historical constellations may require additional authentication requirements to be satisfied before a transaction is approved by a merchant. The additional authentication requirements may include multi-factor authentication or other layered approach systems.

In another aspect of the disclosure, trust groups may be created and granted specific permissions. In an embodiment, a trust group may include any number of persons that allow for interaction between their IoT devices and generated constellations. For instance, a first trust group may include a user and their spouse. Each may allow near full access to each other's IoT devices. Another trust group may include all members of a work group or team. Transaction computing platform 106 may determine and recommend specific trust groups based on analysis of intersecting constellations. Each trust group may define permissions levels and levels of device sharing. For instance, a user may allow a next door neighbor access to their outdoor IoT camera but not allow access to their IoT enabled phone.

Figure 4:
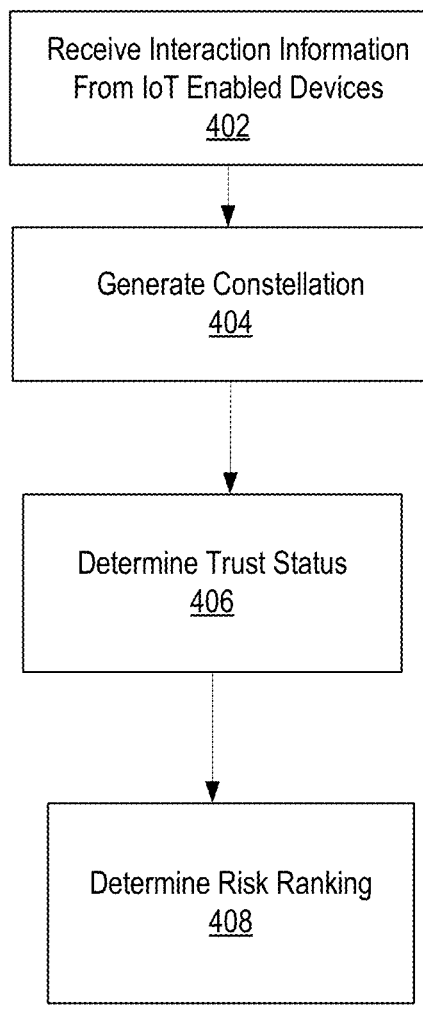
FIG. 4 illustrates a method for authenticating transactions in accordance with an aspect of the disclosure.

FIG. 4 illustrates a method for authenticating transactions in accordance with an aspect of the disclosure. In step 402, transaction computing platform 106 may receive from a plurality of IoT enabled devices, information regarding interactions with a user of the plurality of IoT enabled devices. In step 404, transaction computing platform 106 may generate a constellation. In an embodiment, the constellation may be based on the received information regarding the interactions with the user of the plurality of IoT enabled devices. In step 406, transaction computing platform 106 may determine a trust status based on the generated constellation. The determined trust status may be transmitted to a plurality of registered IoT enabled devices. In step 408, transaction computing platform 106 may determine a risk ranking based on the generated constellations.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. A method for authenticating a financial transaction associated with a user using a plurality of IoT enabled devices, the method comprising:

receiving, by a transaction computing platform comprising at least one processor and memory, from the plurality of IoT enabled devices information regarding interactions with the user of the plurality of IoT enabled devices, wherein the information regarding interactions comprises geolocation information indicating physical locations of the interactions and time stamp information indicating times of the interactions;

receiving, by the transaction computing platform, additional interaction information from at least one third party IoT enabled device regarding interactions with the user, wherein the at least one third party IoT enabled device is operated by an entity distinct from the user and the transaction computing platform;

generating, by the transaction computing platform, a first constellation based on the received information regarding the interactions with the user from the plurality of IoT enabled devices, wherein the first constellation represents a pattern of the user's interactions with the plurality of IoT enabled devices over a first time period;

generating, by the transaction computing platform, a third constellation based on the received additional interaction information from the at least one third party IoT enabled device and the received information regarding the interactions with the user from the plurality of IoT enabled devices, wherein the third constellation represents a combined pattern of the user's interactions with both the plurality of IoT enabled devices and the at least one third party IoT enabled device over a second time period;

comparing, by the transaction computing platform, the first constellation to at least a second constellation stored in the memory of the transaction computing platform, wherein the second constellation represents a historical pattern of the user's interactions with the plurality of IoT enabled devices over a prior time period;

determining, by the transaction computing platform using a neural network, a constellation pattern from the compared first constellation and the at least the second constellation, wherein the constellation pattern represents a unique digital fingerprint of the user's habitual IoT interactions derived from the geolocation information and the time stamp information;

wherein determining, by the transaction computing platform using the neural network. the constellation pattern further comprises:

analyzing, by the neural network, temporal sequences of the interactions with the user from the plurality of IoT enabled devices based on the time stamp information;

correlating, by the neural network, the temporal sequences with the geolocation information to identify habitual spatial-temporal patterns of the user;

outputting, by the neural network, the constellation pattern based on the habitual spatial- temporal patterns wherein the neural network comprises a Long Short-Term Memory (LSTM) neural network configured to process sequential data from the plurality of IoT enabled devices determining, by the transaction computing platform, a trust status based on the determined constellation pattern, wherein the trust status indicates whether the financial transaction is authorized by the user;

determining, by the transaction computing platform, a risk ranking based on the determined constellation pattern, wherein the risk ranking quantifies a likelihood of fraud in the financial transaction based on deviations of the determined constellation pattern from the historical pattern represented by the second constellation;

updating, by the transaction computing platform, the risk ranking in real-time based on a defined time period and detection of a newly generated constellation, wherein the newly generated constellation is based on subsequently received information from the plurality of IoT enabled devices; and transmitting, by the transaction computing platform, the trust status to the plurality of IoT enabled devices to enable approval or denial of the financial transaction based on the trust status.

2. The method of claim 1, further comprising:

registering, by the transaction computing platform, the plurality of IoT enabled devices to an IoT based authentication service;

assigning, by the transaction computing platform, a private key to each of the plurality of IoT enabled devices; and authenticating, by the transaction computing platform, communications between the plurality of IoT enabled devices and the transaction computing platform using the private key.

3. The method of claim 1, further comprising:

receiving, by the transaction computing platform, permission from the user to share the trust status with a merchant IoT enabled device;

transmitting, by the transaction computing platform, the trust status to the merchant IoT enabled device without identifiable information about the user; and enabling, by the merchant IoT enabled device, approval or denial of the financial transaction at a point of sale based on the trust status.

4. The method of claim 1, wherein determining the trust status further comprises:

evaluating, by the transaction computing platform, a consecutive number of interactions with the plurality of IoT enabled devices within a specified time period;

comparing, by the transaction computing platform, the consecutive number of interactions to a known constellation stored in the memory; and assigning, by the transaction computing platform, the trust status based on whether the consecutive number of interactions matches the known constellation.

5. The method of claim 1, further comprising:

detecting, by the transaction computing platform, a discrepancy between the geolocation information of the financial transaction and the geolocation information of the first constellation;

prompting, by the transaction computing platform, the user to confirm authentication of the financial transaction based on the discrepancy; and updating, by the transaction computing platform, the trust status based on a response from the user to the prompt.

6. The method of claim 1, further comprising:

identifying, by the transaction computing platform, a trust group comprising the user and at least one additional user;

receiving, by the transaction computing platform, permission from the user and the at least one additional user to share IoT interaction data between their respective IoT enabled devices; and generating, by the transaction computing platform, an additional constellation based on the shared IoT interaction data for use in determining the trust status.

7. The method of claim 1, wherein determining the risk ranking further comprises:

calculating, by the transaction computing platform, a number of interactions with third party IoT enabled devices in the determined constellation pattern;

assessing, by the transaction computing platform, a deviation of the number of interactions from a historical number of third party interactions in the second constellation; and adjusting, by the transaction computing platform, the risk ranking based on the deviation.

8. The method of claim 1, further comprising notifying, by the transaction computing platform, the user of a denial of the financial transaction via a notification sent to at least one of the plurality of IoT enabled devices, wherein the notification comprises an email, text message, or phone message.

9. The method of claim 1, wherein the plurality of IoT enabled devices comprises at least one of a smart refrigerator, a smart thermostat, a washing machine, an outdoor floodlight security camera, or a streaming music player, each configured to detect interactions with the user using sensors.

10. A method for authenticating a financial transaction associated with a user using a plurality of IoT enabled devices within an IoT based authentication system, the method comprising:

receiving, by a transaction computing platform comprising at least one processor and memory, from the plurality of IoT enabled devices information regarding interactions with the user of the plurality of IoT enabled devices, wherein the information regarding interactions comprises geolocation information indicating physical locations of the interactions and time stamp information indicating times of the interactions, and wherein the plurality of IoT enabled devices comprises at least one of a smart refrigerator, a smart thermostat, a washing machine, an outdoor floodlight security camera, or a streaming music player, each configured to detect interactions with the user using sensors;

receiving, by the transaction computing platform, additional interaction information from at least one third party IoT enabled device regarding interactions with the user, wherein the at least one third party IoT enabled device is operated by an entity distinct from the user and the transaction computing platform;

registering, by the transaction computing platform, the plurality of IoT enabled devices and the at least one third party IoT enabled device to the IoT based authentication system;

assigning, by the transaction computing platform, a private key to each of the plurality of IoT enabled devices and the at least one third party IoT enabled device;

authenticating, by the transaction computing platform, communications between the plurality of IoT enabled devices, the at least one third party IoT enabled device, and the transaction computing platform using the private key to ensure secure data exchange;

generating, by the transaction computing platform, a first constellation based on the received information regarding the interactions with the user from the plurality of IoT enabled devices, wherein the first constellation represents a pattern of the user's interactions with the plurality of IoT enabled devices over a first time period;

generating, by the transaction computing platform, a third constellation based on the received additional interaction information from the at least one third party IoT enabled device and the received information regarding the interactions with the user from the plurality of IoT enabled devices, wherein the third constellation represents a combined pattern of the user's interactions with both the plurality of IoT enabled devices and the at least one third party IoT enabled device over a second time period;

identifying, by the transaction computing platform, a trust group comprising the user and at least one additional user;

receiving, by the transaction computing platform, permission from the user and the at least one additional user to share IoT interaction data between their respective IoT enabled devices;

generating, by the transaction computing platform, an additional constellation based on the shared IoT interaction data from the trust group, wherein the additional constellation represents a collective pattern of interactions across the trust group;

comparing, by the transaction computing platform, the first constellation to at least a second constellation stored in the memory of the transaction computing platform, wherein the second constellation represents a historical pattern of the user's interactions with the plurality of IoT enabled devices over a prior time period;

determining, by the transaction computing platform using a Long Short-Term Memory (LSTM) neural network, a constellation pattern from the compared first constellation and the at least the second constellation by:

analyzing, by the LSTM neural network, temporal sequences of the interactions with the user from the plurality of IoT enabled devices based on the time stamp information;

correlating, by the LSTM neural network, the temporal sequences with the geolocation information to identify habitual spatial-temporal patterns of the user; and outputting, by the LSTM neural network, the constellation pattern based on the habitual spatial-temporal patterns, wherein the constellation pattern represents a unique digital fingerprint of the user's habitual IoT interactions derived from the geolocation information and the time stamp information;

determining, by the transaction computing platform, a trust status based on the determined constellation pattern and the additional constellation by:

evaluating, by the transaction computing platform, a consecutive number of interactions with the plurality of IoT enabled devices within a specified time period;

comparing, by the transaction computing platform, the consecutive number of interactions to a known constellation stored in the memory; and assigning, by the transaction computing platform, the trust status based on whether the consecutive number of interactions matches the known constellation, wherein the trust status indicates whether the financial transaction is authorized by the user;

determining, by the transaction computing platform, a risk ranking based on the determined constellation pattern by:

calculating, by the transaction computing platform, a number of interactions with third party IoT enabled devices in the determined constellation pattern;

assessing, by the transaction computing platform, a deviation of the number of interactions from a historical number of third party interactions in the second constellation; and adjusting, by the transaction computing platform, the risk ranking based on the deviation, wherein the risk ranking quantifies a likelihood of fraud in the financial transaction based on deviations of the determined constellation pattern from the historical pattern represented by the second constellation;

detecting, by the transaction computing platform, a discrepancy between the geolocation information of the financial transaction and the geolocation information of the first constellation;

prompting, by the transaction computing platform, the user to confirm authentication of the financial transaction based on the discrepancy via a notification to at least one of the plurality of IoT enabled devices;

updating, by the transaction computing platform, the trust status based on a response from the user to the prompt;

updating, by the transaction computing platform, the risk ranking in real-time based on a defined time period and detection of a newly generated constellation, wherein the newly generated constellation is based on subsequently received information from the plurality of IoT enabled devices;

receiving, by the transaction computing platform, permission from the user to share the trust status with a merchant IoT enabled device;

transmitting, by the transaction computing platform, the trust status to the plurality of IoT enabled devices and the merchant IoT enabled device without identifiable information about the user to enable approval or denial of the financial transaction at a point of sale based on the trust status;

notifying, by the transaction computing platform, the user of a denial of the financial transaction via a notification sent to at least one of the plurality of IoT enabled devices, wherein the notification comprises an email, text message, or phone message; and denying, by the transaction computing platform, the financial transaction at the point of sale based on the trust status indicating an unauthorized transaction and the risk ranking exceeding a predetermined fraud threshold.

11. A system for authenticating a financial transaction associated with a user using a plurality of IoT enabled devices, the system comprising:

a transaction computing platform including:

at least one processor;

memory storing computer-readable instructions that, when executed by the at least one processor, cause the transaction computing platform to:

receive from the plurality of IoT enabled devices information regarding interactions with the user of the plurality of IoT enabled devices, wherein the information regarding interactions comprises geolocation information indicating physical locations of the interactions and time stamp information indicating times of the interactions;

receive additional interaction information from at least one third party IoT enabled device regarding interactions with the user, wherein the at least one third party IoT enabled device is operated by an entity distinct from the user and the transaction computing platform;

generate a first constellation based on the received information regarding the interactions with the user from the plurality of IoT enabled devices, wherein the first constellation represents a pattern of the user's interactions with the plurality of IoT enabled devices over a first time period;
generate a third constellation based on the received additional interaction information from the at least one third party IoT enabled device and the received information regarding the interactions with the user from the plurality of IoT enabled devices, wherein the third constellation represents a combined pattern of the user's interactions with both the plurality of IoT enabled devices and the at least one third party IoT enabled device over a second time period;
compare the first constellation to at least a second constellation stored in the memory, wherein the second constellation represents a historical pattern of the user's interactions with the plurality of IoT enabled devices over a prior time period;
determine, using a neural network, a constellation pattern from the compared first constellation and the at least the second constellation, wherein the constellation pattern represents a unique digital fingerprint of the user's habitual IoT interactions derived from the geolocation information and the time stamp information;
wherein the neural network comprises a Long Short-Term Memory (LSTM) neural network, and wherein the computer-readable instructions, when executed by the at least one processor, cause the transaction computing platform to determine the constellation pattern by:
analyzing, using the LSTM neural network, temporal sequences of the interactions with the user from the plurality of IoT enabled devices based on the time stamp information;
correlating, using the LSTM neural network, the temporal sequences with the geolocation information to identify habitual spatial-temporal patterns of the user;
outputting, using the LSTM neural network, the constellation pattern as the unique digital fingerprint based on the habitual spatial-temporal patterns;
determine a trust status based on the determined constellation pattern, wherein the trust status indicates whether the financial transaction is authorized by the user;
determine a risk ranking based on the determined constellation pattern, wherein the risk ranking quantifies a likelihood of fraud in the financial transaction based on deviations of the determined constellation pattern from the historical pattern represented by the second constellation;
update the risk ranking in real-time based on a defined time period and detection of a newly generated constellation, wherein the newly generated constellation is based on subsequently received information from the plurality of IoT enabled devices; and
transmit the trust status to the plurality of IoT enabled devices to enable approval or denial of the financial transaction based on the trust status.

12. The system of claim 11, wherein the computer-readable instructions, when executed by the at least one processor, further cause the transaction computing platform to:
register the plurality of IoT enabled devices and the at least one third party IoT enabled device to an IoT based authentication service hosted by the transaction computing platform;
assign a unique private key to each of the plurality of IoT enabled devices and the at least one third party IoT enabled device during registration;
authenticate all communications between the plurality of IoT enabled devices, the at least one third party IoT enabled device, and the transaction computing platform using the unique private key to establish a trusted key relationship; and
encrypt the information regarding interactions and the additional interaction information using the unique private key prior to transmission to the transaction computing platform.

13. The system of claim 11, wherein the computer-readable instructions, when executed by the at least one processor, further cause the transaction computing platform to:
receive permission from the user to share the trust status with a merchant IoT enabled device at a point of sale;
transmit the trust status to the merchant IoT enabled device without identifiable information about the user;
enable approval or denial of the financial transaction at the point of sale based on the trust status; and
notify the user of a denial of the financial transaction via a notification sent to at least one of the plurality of IoT enabled devices, wherein the notification comprises an email, text message, or phone message indicating a reason for the denial.

14. The system of claim 11, wherein the computer-readable instructions, when executed by the at least one processor, cause the transaction computing platform to determine the trust status by:
evaluating a consecutive number of interactions with the plurality of IoT enabled devices within a specified time period;
comparing the consecutive number of interactions to a known constellation stored in the memory; and
assigning the trust status based on whether the consecutive number of interactions matches the known constellation within a predefined tolerance threshold.

15. The system of claim 11, wherein the computer-readable instructions, when executed by the at least one processor, further cause the transaction computing platform to:
detect a discrepancy between the geolocation information of the financial transaction and the geolocation information of the first constellation;
prompt the user to confirm authentication of the financial transaction by sending a confirmation request to at least one of the plurality of IoT enabled devices;
receive a response from the user via the at least one of the plurality of IoT enabled devices; and
update the trust status based on the response, wherein the trust status is set to untrusted if no response is received within a predetermined time limit.

16. The system of claim 11, wherein the computer-readable instructions, when executed by the at least one processor, further cause the transaction computing platform to:
identify a trust group comprising the user and at least one additional user based on overlapping IoT interaction patterns;
receive permission from the user and the at least one additional user to share IoT interaction data between their respective IoT enabled devices;
generate an additional constellation based on the shared IoT interaction data, wherein the additional constellation represents a collective pattern of interactions across the trust group; and adjust the trust status and the risk ranking using the additional constellation to reflect collective trust behavior of the trust group.

17. The system of claim 11, wherein the plurality of IoT enabled devices comprises at least one of a smart refrigerator, a smart thermostat, a washing machine, an outdoor floodlight security camera, or a streaming music player, each configured with sensors to detect interactions with the user, and wherein the computer-readable instructions, when executed by the at least one processor, further cause the transaction computing platform to:
  calculate a number of interactions with the at least one third party IoT enabled device in the determined constellation pattern;
  assess a deviation of the number of interactions from a historical number of third party interactions in the second constellation;
  adjust the risk ranking based on the deviation and a predetermined fraud threshold; and
  deny the financial transaction if the risk ranking exceeds the predetermined fraud threshold and the trust status indicates an unauthorized transaction.

\* \* \* \* \*